United States Patent
Clark (10) Patent No.: US 6,304,905 B1
(45) Date of Patent: Oct. 16, 2001

(54) DETECTING AN ACTIVE NETWORK NODE USING AN INVALID PROTOCOL OPTION

(75) Inventor: Glenwood Clark, Redmond, WA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/154,608

(22) Filed: Sep. 16, 1998

(51) Int. Cl.⁷ .................................................. G06F 15/173

(52) U.S. Cl. ........................................... 709/224; 714/4.9

(58) Field of Search ..................................... 709/224, 223, 709/220, 204, 203; 707/501; 340/825.29, 7.23, 5.3; 714/49, 39, 47; 370/252

(56) References Cited

U.S. PATENT DOCUMENTS

| | | | |
|---|---|---|---|
| 4,780,883 | * 10/1988 | O'Connor et al. | 375/7 |
| 4,807,118 | * 2/1989 | Lin et al. | 364/200 |
| 5,471,461 | * 11/1995 | Engdahl et al. | 370/17 |
| 5,471,616 | * 11/1995 | Johnson et al. | 395/700 |
| 5,513,244 | * 4/1996 | Joao et al. | 379/58 |
| 5,627,766 | * 5/1997 | Beaven | 364/551.01 |
| 5,640,513 | * 6/1997 | Dauerer et al. | 395/200.11 |
| 5,812,529 | * 9/1998 | Czarnik et al. | 370/245 |
| 5,845,292 | * 9/1998 | Bohannon et al. | 707/202 |
| 5,914,666 | * 6/1999 | Zingsheim et al. | 340/825.07 |
| 5,925,127 | * 7/1999 | Ahmad | 713/200 |
| 6,006,019 | * 12/1999 | Takei | 709/224 |
| 6,021,493 | * 2/2000 | Cromer et al. | 713/200 |
| 6,052,727 | * 4/2000 | Kamalanathan | 709/224 |
| 6,106,399 | * 8/2000 | Baker et al. | 463/42 |

FOREIGN PATENT DOCUMENTS

2022239-A * 7/1990 (CA) .......................... G01R/031/28

OTHER PUBLICATIONS

Waldbusser, RFC 1757, "Remote network monitoring management information base", Feb. 1995, www.Cis.ohio-state.edu, pp. 1–73 (73).*

IBM, "Generalized Request/Reply Machanism for use in Asynchronous Distributed Environments", IBM Technical Disclosure Bulletin, Jan. 1987, vol. 29, issue 8, pp. 3345–3357 (13).*

IBM, "Method for Enabling Software Updates through the Internet", IBM Technical Disclosure Bulletin, Mar. 1997, vol. 40, issue 3, pp. 123–124 (2).*

IBM, "Device Arbitration and Selection Method for Personal Computers", IBM Technical Disclosure Bulletin, Sep. 1994, vol.37, issue 9, pp. 307–312 (6).*

(List continued on next page.)

Primary Examiner—Mark H. Rinhart
Assistant Examiner—Bunjob Jaroenchonwanet
(74) Attorney, Agent, or Firm—Hickman Palermo Truong & Becker LLP; Christopher J. Palermo (57) ABSTRACT

A method and apparatus for providing notification to a client that an access server is on-line during a communication session is disclosed. The client and the access server execute an embedded protocol, such as telnet, to define the communication session. The protocol defines a negotiation-style communication session in which a client issues a request and a server must issue a mandatory acknowledgment that identifies how the request is handled. A command option is sent from the client to the access server, wherein the option is an invalid telnet option. The access server responds, indicating that the option is invalid. The access server's response provides a positive indication to the client that the access server is on-line. The process can be repeated frequently without requiring any significant system resources. If the access server does not immediately respond, the communication session between the client and access server can thereafter be recovered or terminated, thereby maximizing system resources.

23 Claims, 3 Drawing Sheets

OTHER PUBLICATIONS

Microsoft, MD–DOS User's Guide Version 4.01, Microsoft. pp. (10) 368–375 and 2 cover pages, 1987.*

Wetherall et al., The active IP option, 7th ACM sigops, pp. (8) 1–8, Sep. 1996.*

Comer, Internetworking With TCPIP, vol. 1, Third Edition, Prentice Hall, pp. (12) 407–416 and 2 cover pages, 1995.*

Postel, RFCO792, Internet Control Message Protogcol, rfc.fh–koeln.de, pages (24) 1–24, Sep. 1981.*

* cited by examiner

DETECTING AN ACTIVE NETWORK NODE USING AN INVALID PROTOCOL OPTION

FIELD OF THE INVENTION

The present invention relates generally to telecommunications. The invention relates more specifically to apparatus and methods for allowing either a client or host, which are communicating by way of an access server during a remote session, to know when the other has gone offline.

BACKGROUND OF THE INVENTION

Many telecommunication functions require computer users to connect to remote services to retrieve or transmit information. Increasingly, these remote services are accessed using an asynchronous dial up connection. This class of functions may include, but is not limited to, dial up connections to the Internet, connections to bulletin boards, connections to internal and external databases and sending and receiving faxes. These functions are carried out during interactive, character-oriented communication sessions via a modem. This is typically known as outbound modem dialing.

To support remote login sessions, various computer manufacturers have developed facilities that allow their users to log in remotely from one computer to another. Within the Internet, the most commonly used method is a facility called "telnet," which is the name of the protocol used to support remote login sessions and also the name of the Transmission Control Protocol/Internet Protocol ("TCP/IP") remote login program. TCP/IP refers to the suite of protocols that define the Internet. Originally designed for the UNIX™ operating system, TCP/IP software is now available for every major kind of computer operating system. To be on the Internet, a computer must have TCP/IP software. The telnet protocol defines how local and remote computers talk to each other to support a remote login session. A more complete discussion of remote login using telnet is described in D. Dem, "The Internet Guide For New Users," pp. 247–67 (McGraw Hill 1994).

Many computer users are connected to the Internet by access servers on local area networks or enterprise networks. An example of an access server is model number (AS5200), commercially available from Cisco Systems, Inc. To help defer the cost of installing and maintaining additional phone lines, which may be used very little per user, many equipment manufacturers have added the ability to establish remote sessions on the outbound ports of access servers and routers. These remote sessions are supported by an embedded telnet protocol operating in conjunction with other communication software, such as a communication port director.

To support remote sessions via an access server, as opposed to a direct personal computer/remote service connection, the telnet protocol has undergone revision. The name and the result of the process for disseminating information about a proposed standard on the Internet is known as Request for Comments ("RFC"). The standards are currently proposed and published on-line at http:http://info.intcrnet.isi.edu/innotes/rfc/files/rfc2217.txt.

In RFC 2217, entitled "Telnet Com Port Control Option" and published in Oct. of 1997, the present inventor identified three new areas of functionality within the telnet protocol which needed updating to successfully support the needs of outbound modem dialing. A first new function is the ability for a client to send corn port configuration information to an access server which is connected to the outbound modem. This ensures that data transmitted and received by the modem is formatted correctly at the byte level. A second new function is the ability for an access server to inform a client of any modem line or signal changes, such as carrier detect (RLSD) changes. This information is vital, since many client software packages use this information to determine if a session with a remote service has been established. The third new function provides the ability to manage flow control between the client and the access server which does not interfere with the flow control mechanisms used by the session between the client and the remote service.

The first new function is carried out by causing a client and server to negotiate a corn port configuration by exchanging messages. The negotiation of the corn port control option protocol uses the standard telnet negotiation protocol mechanism. This mechanism involves the exchange of messages that request an action (a "DO" or "DON'T" messages) and messages that respond to such requests ("WILL" or "WON'T" messages). RFC 2217 identifies the following negotiation messages having the following meanings:

IAC WILL COM-PORT-OPTION

The sender of this command is willing to send corn port control option commands.

IAC WONT COM-PORT-OPTION

The sender of this command refuses to send corn port control option commands.

IAC DO COM-PORT-OPTION

The sender of this command is willing to accept corn port control option commands.

IAC DONT COM-PORT-OPTION

The sender of this command refuses to accept corn port control option commands.

The client can send these commands at any time and at multiple times throughout a telnet session. Each command transmitted from the client to the access server must be acknowledged once the command has been processed by the access server. This confirmation informs the client of the value set at the access server after the processing of the command. This acknowledgment is not used to acknowledge the receipt of the command, which is handled at the TCP protocol layer. Its purpose is to inform the client of the value in use, which may be different than the value requested in the client's command. For example, the client may request a baud rate higher than the access server can provide. If the client does not receive an acknowledgment within a reasonable time, the client may wish to re-send the command or terminate the session.

Once DO and WILL commands have been negotiated, the client may send any of the following Com-Port Control Option commands:

| Command Name | Client to Access Server | Access Server to Client |
|---|---|---|
| SIGNATURE | Text | Text |
| SET-BAUDRATE | 1 | 101 |
| SET-DATASIZE | 2 | 102 |
| SET-PARITY | 3 | 103 |

-continued

| Command Name | Client to Access Server | Access Server to Client |
|---|---|---|
| SET-STOPSIZE | 4 | 104 |
| SET-CONTROL | 5 | 105 |
| NOTIFY-LINESTATE | 6 | 106 |
| NOTIFY-MODEMSTATE | 7 | 107 |
| FLOWCONTROL-SUSPEND | 8 | 108 |
| FLOWCONTROL-RESUME | 9 | 109 |
| SET-LINESTATE-MASK | 10 | 110 |
| SET-MODEMSTATE-MASK | 11 | 111 |
| PURGE-DATA | 12 | 112 |

The following format may be used to send the commands: IAC SB COM-PORT-OPTION COMMAND NAME<value>IAC SE or IAC SB COM-PORT-OPTION COMMAND NAME<text>IAC SE. "IAC" means Interpret As Command, and is defined for use in Telnet in RFC 854, character decimal code 255; "SB" means Subnegotiation Begin, and is defined for character code 250; "SE" means Subnegotiation End, and is defined for character code 240. The Command Name can be any one of those listed above with the appropriate value or text inserted.

If a client sends a command and there is no acknowledgment by the access server within a reasonable time, the client may wish to re-send the command or terminate the session to save system resources. Generally, a reasonable time period to re-send or terminate would be twice the delay acknowledgement ("delay ack") timer in TCP/IP If the delay ack timer is ten seconds, then the client would wait approximately 20 or 30 seconds before re-sending or terminating. This 20–30 second time period ensures that commands will not be re-sent or that the receiver will not be terminated unnecessarily in the event that the receiver is only slowing down or interrupted temporarily.

Unfortunately, when telnet operates as an embedded protocol to support remote TCP/IP sessions, there is no efficient way for either a client or an access server to know when a client or server at the opposite end of the connection has gone offline. In a past approach, a user would execute telnet using a terminal interface, so that the user could type commands to the telnet program and view responses by the remote system. In this past approach, there are visual cues to indicate when either the client or access server had gone off-line. If a user of the client, a PC user for example, depressed a key at the client machine and received no response, the user could surmise that the host had gone offline, and could thereafter terminate the session. Alternatively, the user could test whether the PC had stopped operating or crashed. In this context, a device is "off-line" when it is disconnected, crashed, or otherwise logically or physically unavailable.

When telnet is operated as an embedded protocol within an access server or router, however, there are no visual cues. The telnet program is executed by the access server or router within a network, but such devices do not provide a visual display to the end user when they are in operation. Currently, the only way to know whether the client or access server has gone off-line or become unavailable is to use a timeout mechanism. In some telnet systems, timeout code will disconnect the access server and client after a pre-defined period of inactivity. This approach is a waste of system resources, however, because the access servers and/or outbound modems are occupied and unavailable during this period. Maintaining a TCP/IP connection for an Internet activity using the telnet protocol, for example, ties up buffer space and control sources in operating systems on both ends.

Most systems have limited resources, and it is undesirable to leave open connections where there is no communication. Leaving an open telnet connection can also be a security breach.

Accordingly, it is desirable to have a method or system that enables a client or server to know immediately when the other has gone off-line. With such a method or system, the connection could be terminated or a recovery option could be implemented immediately.

One solution is to create a new protocol to handle this situation. However, this approach is undesirable because of the burden associated with creating and obtaining approval for a new standard. It is desirable to have a method or system that does not require development of a new system protocol and that could use the available telnet protocol options. Further, it is desirable to have a method that would allow a client or access server to let the other know it is "alive" on a frequent basis without requiring an inordinate amount of system resources.

SUMMARY OF THE INVENTION

The foregoing needs, and other needs and objectives that will become apparent from the description herein, are achieved by the present invention, which comprises, in one aspect, a method for a first computer process to determine that a second computer process is active during a communication session using a protocol that defines one or more request messages and one or more corresponding mandatory acknowledgment messages, comprising sending a command from the first computer process to the second computer process, in which the command comprises at least one parameter value that is invalid under the protocol; sending a response from the second computer process to the first computer process, in which the response indicates that the parameter value is invalid; and determining, at the first computer process, that the second computer process is active.

One feature of this aspect involves testing for immediate receipt of the response from the second computer process; and at the first computer process, determining that the second computer process is off-line when the response is not immediately received. A related feature is terminating the communication session when the second computer process does not immediately respond to the command. Another related feature is implementing a recovery procedure when the second computer process does not immediately respond to the command.

According to another feature, the first computer process is a client and the second computer process is an access server that executes the protocol in embedded fashion. In still another feature, the second computer process includes a corn port interface coupled to a modem interface, in which the modem interface is coupled to a remote service that provides information to the client.

Other aspects and features will become apparent from the following description and appended claims. In particular, the invention encompasses an apparatus and a computer-readable medium in the form of a carrier wave that are configured, in certain embodiments, to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method of notifying a client or server that a client or server has gone off-line is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW OF OPERATIONAL CONTEXT COMMUNICATION SYSTEM

Figure 1:
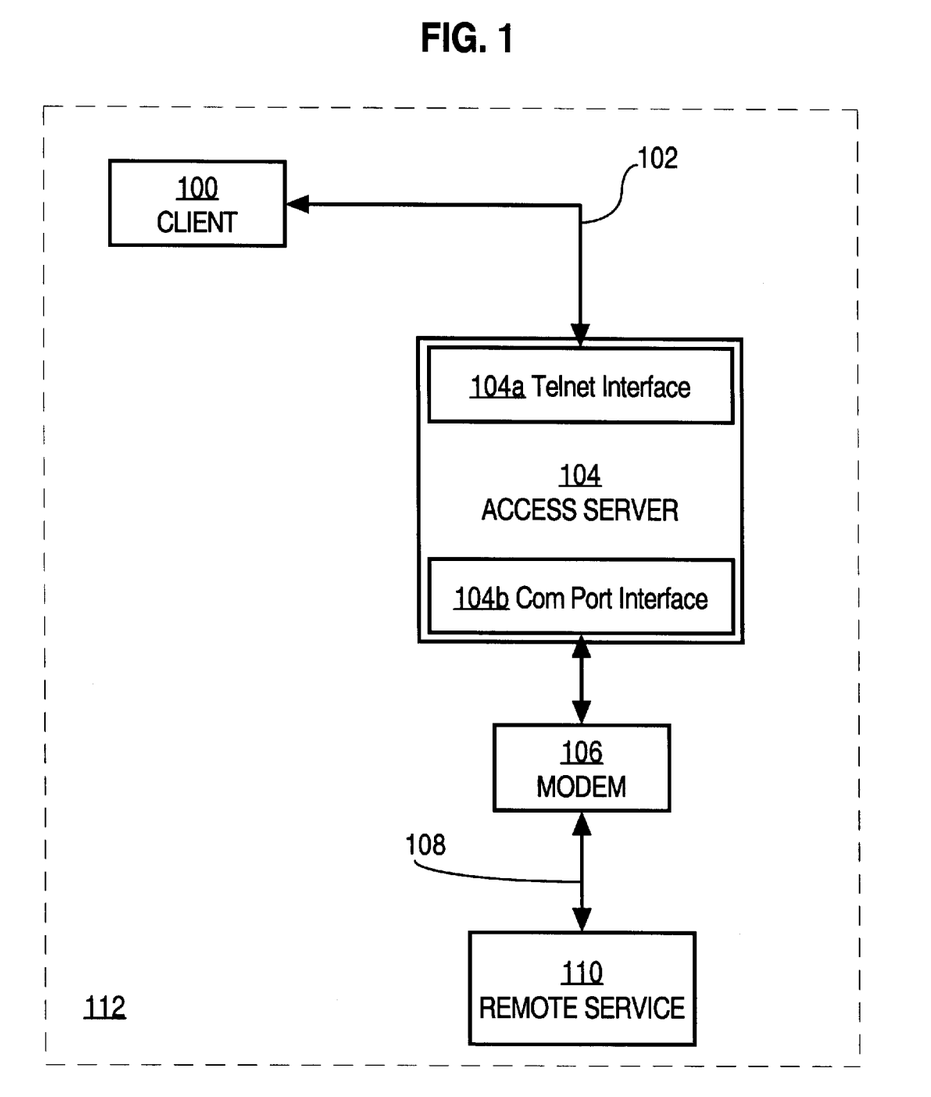
FIG. 1 is a block diagram of a communication system.

FIG. 1 is a block diagram of a communication system 112 illustrating a client 100 that is coupled to a remote service 110 through access server 104. In the preferred embodiment, the client 100 resides on a local area or enterprise network 102 supported by an access server 104. The client 100 may be any network device that can carry out a telnet session with the access server 104. Client 100 may specifically refer to a personal computer or any device having a communication port wherefrom data may be transferred. Client 100 may also refer to any software program on the computer or device that is used to contact and obtain data from a server software program, where the client and server are either located on the same premise or are in different locations separated by a significant distance. Any client 100 programs may be designed to work with one or more specific kinds of server programs, and each server may require a specific kind of client.

The communication port traffic from the client 100 is converted to a telnet session and sent to the access server 104. In the preferred embodiment, the access server 104 is any network device which accepts telnet sessions and passes the data received to a corn port, and passes data received from the communication port to the client 100 via the telnet session. The access server 104 may be a computer, or a software package, which provides a specific kind of service to client software running on other computers. Access server 104 may therefore refer to a particular piece of software, or to the machine on which the software is running. A single server machine could have several different server software packages running on it, thus providing many different servers to clients on the network.

In the preferred embodiment, the access server 104 will have a protocol interface, such as the telnet interface 104a shown in FIG. 1. Access server 104 also has at least one communication port interface 104b ("comport interface"), and an interface to a local area or enterprise network 102. The access server 104 may provide point-to-point protocol connections, meaning that the access server 104 uses a regular telephone line and a modem to make network connections. Alternatively, the access server 104 may use any protocol which allows for connection to an external network such as the global, packet-switched network known as the Internet.

The modem 106 interfaced with the corn port interface 104b can be any modem device that connects the server to a public switched network by network connection 108, allowing the client to communicate with a remote service 110 through the phone system. Modem 106 may comprise a single modem device or a plurality ("bank") of modems. The remote service 110 can be any service that accepts dial-up connections, such as an Internet Service Provider, a bulletin board or even a fax machine.

In this configuration, access server 104 may provide selective access of client 100 to the remote service 110 or to network connection 108. For example, the access server 104 may be configured with appropriate software to authenticate client 100 when the client seeks to access the network connection. The access server 104 also may be a router or packet data switch.

Client 100 and access server 104 are examples of network nodes or computer processes with which embodiments of the invention may be used. The network nodes may be any element of a network. A client/server relationship among the nodes is not required. Client 100 and access server 104 may be implemented in hardware, software, or a combination of both hardware and software.

EMBEDDED PROTOCOL

Preferably, access server 104 executes an embedded protocol that defines a communication session between client 100 and access server 104. Within the Internet, telnet is the most commonly used facility for supporting remote login sessions. The telnet protocol defines how local and remote computers talk to one another to support a communications session whereby a local computer remotely contacts and logs into the remote computer ("remote login session"). Telnet currently has approximately forty-five (45) on/off parameters that are set during a negotiation phase. In the negotiation phase, the client and access server determine the parameters which will later guide and facilitate the transfer and communication of data. The parameters include, for example, terminal speed, window size, display location, terminal location number, end of record, echo and other aspects of the communication session. The parameters may be set by issuing a command having the syntax "DO [value]", where "value" is a two-octet (2 bytes) value that can represent any value from 0–255.

Telnet has a standard negotiation mechanism. The negotiation mechanism involves communicating request and response messages between the client and server or between a local computer and a remote computer. The negotiation protocol uses four (4) commands in the form of "WILL," "WON'T", "DO" and "DON'T" commands:

IAC WILL [value]. The sender of this command is willing to send commands represented by "value".

IAC WONT [value]. The sender of this command refuses to send commands represented by "value".

IAC DO [value]. The sender of this command is willing to accept commands represented by "value".

IAC DONT [value]. The sender of this command refuses to accept commands represented by "value".

In the preferred embodiment, either the client 100 or access server 104 could generate the initial DO or WILL command. In response, either the client 100 or access server 104 responds with the WONT or DONT command.

Telnet is merely one example of a protocol that can be used with embodiments of the invention. No particular protocol is required. What is important is that the protocol defines a request-response mode of operation and defines a mandatory response when an invalid request or command is received. For example, a first network node issues a request to a second network node, and the protocol dictates that the second network node shall respond with a message that acknowledges how the second network node is handling the request. The responsive message may be in the nature of an acknowledgment, a refusal, a success report, an error message, a confirmation, or the like. In one embodiment, the protocol may define a particular mandatory responsive message. In another embodiment, the protocol may define that the responsive message must be returned to the client promptly or immediately. These characteristics, however, are not required.

DETERMINING WHETHER CLIENT OR SERVER IS OFF-LINE

There is no efficient way for either the client 100 or access server 104 to know whether the other is off-line. Prior to the use of telnet as an embedded protocol, the telnet prompt commands and responses could be viewed on a computer display as a user typed requests and received responses from a remote system. If a command was sent and there was no response, a client user could recognize this immediately and either re-send the command or terminate the session. When telnet is operated as an embedded protocol layered with other software, in an access server, router, or other device that does not have a visual user interface, there is no visual way for the client 100 or access server 104 to know whether the other is off-line, whether to recover or terminate the session, thereby saving system resources.

USE OF INVALID OPTION TO NOTIFY CLIENT OR SERVER THAT A DEVICE IS OFF-LINE

Telnet's four primary negotiating commands (DO, DONT, WILL, WONT) are used to negotiate the values of parameters prior to the transfer of data between a client and an access server. There are approximately 45 parameters currently defined in the telnet standards from among 255 available parameters. Approximately 210 available parameters are not currently defined by any RFC or other Internet standard, and are available for future use.

For the 45 parameters that are defined, if a DO command is executed on one end, from the client 100 for example, the access server 104 will respond with an appropriate WILL or WONT. For example, if the client 100 sends a "DO" command with the value "44", possibly followed by other parameter values, the access server 104 will respond with either a "WILL 44" message or a "WONT 44", depending on whether the access server can logically or physically implement the things required by a "44" parameter. The "DO 44" command represents the client 100 telling the access server 104 to set one or more parameters associated with the value "44" to those values that are included with the "DO 44" command. A "WILL 44" response from the access server 104 indicates that the access server 104 is willing to set the parameters and has set them. A WONT response, of course, indicates that the access server 104 cannot or is not willing to set the parameters. In the preferred embodiment, the client 100 can send these commands at any time and at multiple times throughout a telnet session. Each command transmitted from the client 100 to the access server 104 must be acknowledged once the command has been processed by the access server 104. Thus, an important aspect of the telnet protocol is that whenever a server receives a DO or DONT command, the server must respond with either a WILL message or a WONT message. Moreover, telnet requires that the server response must be immediate. This confirmation informs the client 100 of the value set at the access server 104 after the processing of the command.

This acknowledgment is not used to acknowledge the receipt of the command, which is handled at the TCP protocol layer. Instead, its purpose is to inform the client 100 of the value in use, which may be different than the value requested in the client's command. If an acknowledgment is not received by the client 100 within a reasonable time, the client 100 may wish to re-send the command or terminate the session.

To determine whether the client 100 or access server 104 is on-line, the present approach utilizes the standard telnet negotiation protocol and leverages the fact that certain telnet command options, particularly 45–253, have not been allocated. In the preferred embodiment, the client 100 sends a DO [value] command to the access server 104, where "value" is any undefined telnet parameter value. For example, in one embodiment, "value" is a numeric value between 45 and 253.

Assume, for example, that a "DO 235" command is sent. The client 100 is telling the access server 104 to carry out the telnet command represented by value "235". Since "235" is an undefined parameter value, it is invalid, and the access server 104 can only respond with the message "WONT 235", meaning that the access server cannot implement parameter "235". The "WONT" response by the access server provides a positive signal to the client 100 that the access server 104 is on-line and operating. If the client 100 does not immediately receive a WONT message from the access server 104, the client knows immediately that the access server 104 is off-line. Accordingly, recovery or termination procedures may be implemented immediately.

Figure 2:
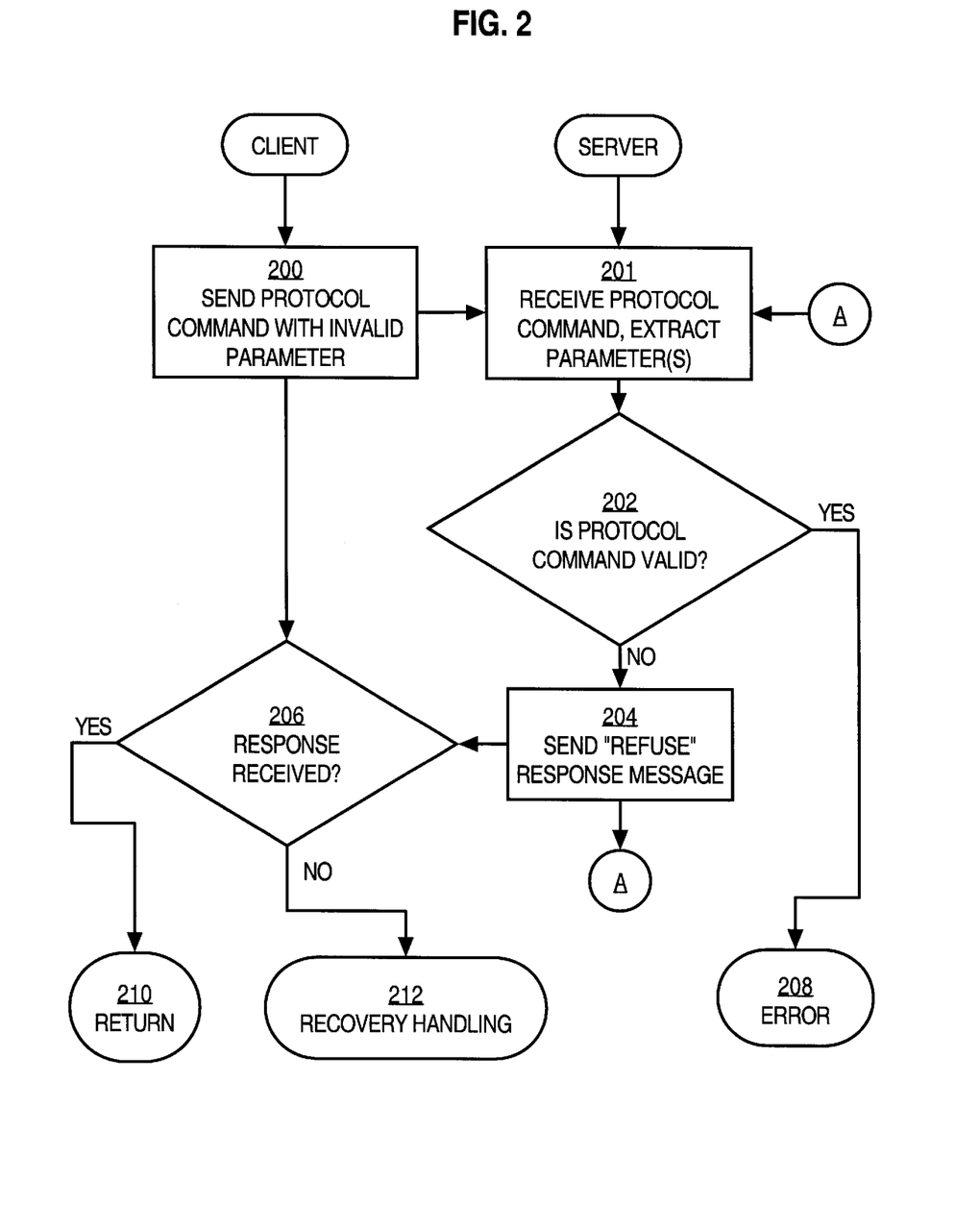
FIG. 2 is a flow chart showing a method of notifying a client or server that a client or server has gone off-line, according to a preferred embodiment.

FIG. 2 is a block diagram showing a method of notifying a client or server that a client or server has gone off-line, according to a preferred embodiment. In particular, FIG. 2 depicts messages exchanged between the dial out modules of the client 100 and access server 104. The process of FIG. 2 may be implemented as one or more computer programs, functions, subroutines, processes, methods and the like, either in stand-alone form or callable from another program or process.

In block 200, the client sends a command in a particular protocol, containing an invalid parameter, to the server. For example, the client sends a DO command using the telnet protocol, with an invalid telnet parameter value, such as a numeric value between "45" and "253".

In block 201, the server receives the protocol command and extracts parameters from it. In block 202, the server tests whether the protocol command is valid based on the parameters. It should be noted that the steps of block 201 and block 202 form a part of conventional telnet protocol processing at the server. Thus, the present process is advantageous in that it does not require any modification of server-side telnet processing.

If the test of block 202 is TRUE, then control is passed to block 208, in which the server processes or responds to the command, as appropriate depending on its contents. In the present process, from the perspective of the client, an error condition exists if control reaches block 208.

If the test of block 202 is FALSE, and the server is on-line, then the server immediately responds to the invalid command by sending a responsive message that refuses to process the command, as shown in block 204. For example, access server 104 responds to client 100 with a telnet WONT command.

In block 206, the client tests whether a response is received promptly from the server. The response by the server is a positive indication to the client that the server is on-line. If a response is received, then the test of block 206 is TRUE, and the process then returns control to the calling process or program, as shown by block 210.

In the preferred embodiment, client 100 executes the telnet DO command with an invalid option approximately every thirty (30) seconds. This ensures that the access server 104 will not be undetectably off-line for any significant period.

If the test of block 206 is FALSE, then the server is off-line, down, or unavailable. Accordingly, as shown by block 212, the client determines how to recover from the failure of the server. A wide range of responsive measures may be undertaken, and the specific responsive measure taken is a decision to be made by the client. For example, the client may carry out a recovery procedure, or set a timer and wait for the server to come on-line, or notify the user through an alarm or appropriate message. Alternatively, the client may terminate the communication session between the client and server.

While the preferred embodiment focuses on outbound modem dialing as a primary use, alternate embodiments are used for any serial device attached to an access server. Such devices could be serial printers, plotters, monitoring devices such as pipe line monitors or medical monitors and general office equipment such as photocopiers and cash registers.

HARDWARE OVERVIEW

Figure 3:
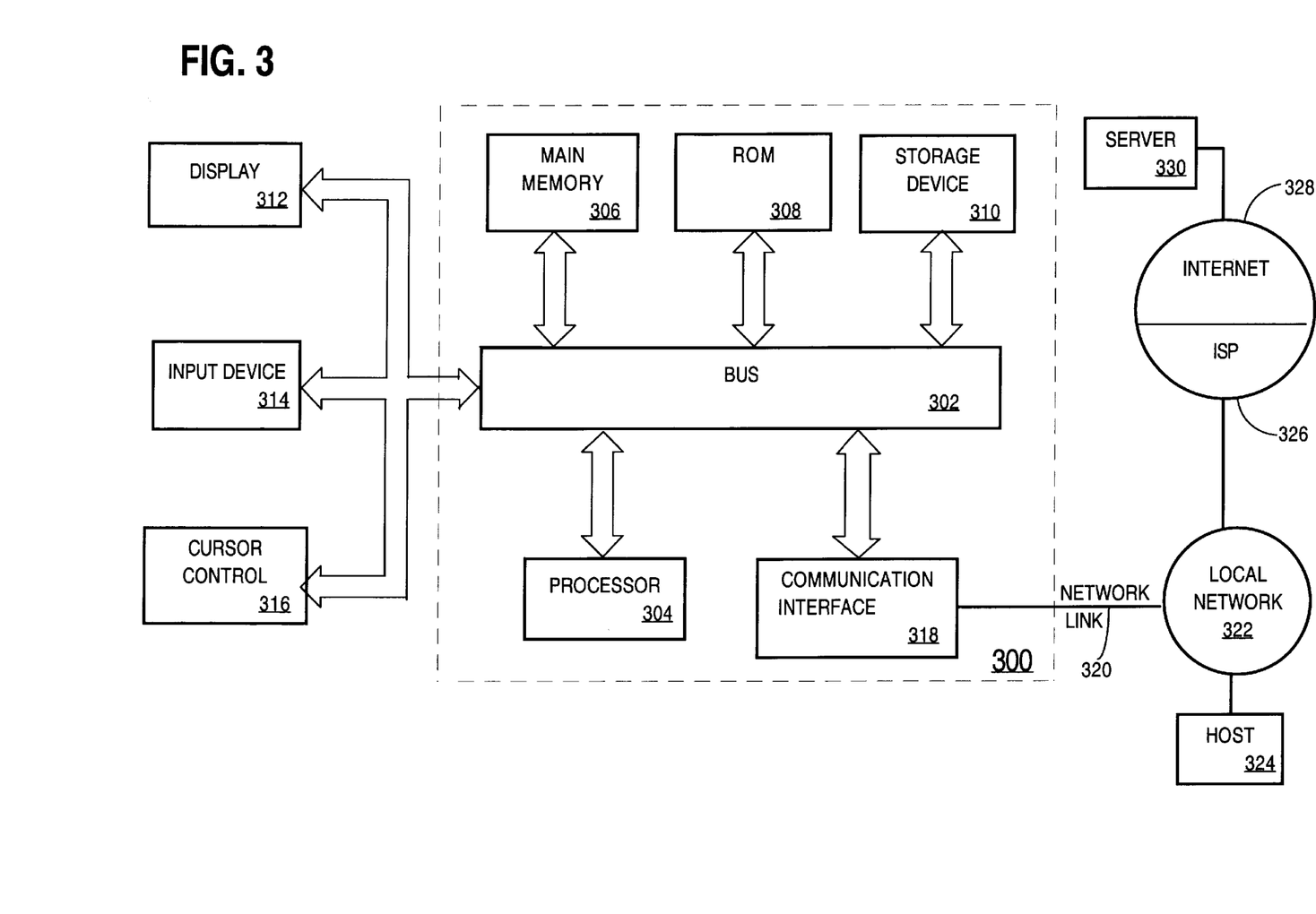
FIG. 3 is a block diagram of a computer system that may be used in the implementation of the invention.

FIG. 3 is a block diagram that illustrates a computer system 300 upon which an embodiment of the invention may be implemented. Computer system 300 includes a bus 302 or other communication mechanism for communicating information, and a processor 303 coupled with bus 302 for processing information. Computer system 300 also includes a main memory 306, such as a random access memory (RAM) or other dynamic storage device, coupled to bus 302 for storing information and instructions to be executed by processor 303. Main memory 306 also may be used for storing temporary variables or other intermediate information during execution of instructions to be executed by processor 303. Computer system 300 further includes a read only memory (ROM) 308 or other static storage device coupled to bus 302 for storing static information and instructions for processor 303. A storage device 310, such as a magnetic disk or optical disk, is provided and coupled to bus 302 for storing information and instructions.

Normally computer system 300 is configured without a display, keyboard, mouse or like devices because such input/output devices are not necessary for embedded operation in a network. Computer system 300 may be coupled via bus 302 to a communications interface 312 that can be coupled to an external terminal or host system, for displaying information to a computer user or for receiving configuration input. For example, communications interface 312 may be an RS-232 port that is coupled to a terminal or workstation. Computer system 300 executes an internetworking operating system, such as the IOS operating system available from Cisco Systems, Inc. The operating system provides a command-line interface to the terminal or workstation over communications interface 312.

The invention is related to the use of computer system 300 for notifying a client or server that another, remotely connected client or server is offline. According to one embodiment of the invention, a method of notifying a client or server that another, remotely connected client or server is offline is provided by computer system 300 in response to processor 303 executing one or more sequences of one or more instructions contained in main memory 306. Such instructions may be read into main memory 306 from another computer-readable medium, such as storage device 310. Execution of the sequences of instructions contained in main memory 306 causes processor 303 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 303 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 303 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 303 retrieves and executes the instructions. The instructions received by main memory 306 may optionally be stored on storage device 310 either before or after execution by processor 303.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 323 or to data equipment operated by an Internet Service Provider (ISP) 326. ISP 326 in turn provides data communication services through the worldwide packet data network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for notifying a client or server that another, remotely connected client or server is offline as described herein.

The received code may be executed by processor 303 as it is received, and/or stored in storage device 310, or other non-volatile storage for later execution. In this manner, computer system 300 may obtain application code in the form of a carrier wave.

VARIATIONS, EXTENSIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for a first network node to determine that a second network node is active during a network communication session using a network communication protocol that defines one or more request messages and one or more corresponding mandatory acknowledgment messages, the method comprising:
    sending a command from the first network node to the second network node using the network communication protocol, in which the command comprises at least one parameter value that is invalid under the protocol;
    receiving a substantially immediate response from the second network node in which the response indicates that the parameter value is invalid; and
    determining, at the network node process, that the second network node is active.

2. The method of claim 1, further comprising:
    testing for substantially immediate receipt of the response from the second network node; and
    at the first computer process, immediately determining that the second network node is off-line when the response is not immediately received.

3. The method of claim 2, further comprising terminating the communication session immediately when the second network node does not immediately respond to the command.

4. The method of claim 2, further comprising implementing a recovery procedure when the second network node does not immediately respond to the command.

5. The method of claim 1, wherein the first network node is a network client and the second network node is an access server that executes the protocol in embedded fashion.

6. A method for a first network node to determine that a second network node is off-line during a network communication session using telnet as an embedded network communication protocol, the method comprising the steps of:
    sending a command from said first network node to said second network node, wherein the command comprises an invalid telnet option that is included in the command intentionally to determine whether the second network node is off-line;
    receiving a response from said second network node, wherein the response indicates that the command contains an invalid option; and
    determining, at the first network node, that the second network node is off-line when the second network node fails to immediately respond to the command.

7. A network access apparatus, comprising:
    an access network node that includes a telnet interface that is coupled to a client network node and a communications interface that is coupled to a network service of a routed computer network;
    means for sending an invalid telnet command option from the client network node to the network access apparatus using the telnet interface;
    means for sending a response from the access computer process to the client network node, in which the response indicates that the command option is invalid; and
    means for determining, at the client network node, that the access network node is active when the response is received substantially immediately and for determining that the access network node is inactive when the response is not received substantially immediately.

8. The apparatus of claim 7, in which the access network node executes the telnet protocol in an embedded fashion.

9. The apparatus of claim 7, further comprising:
    means for testing for immediate receipt of the response from the second network node; and
    means, at the first computer process, for immediately determining that the second network node is off-line when the response is not immediately received.

10. The apparatus of claim 9, further comprising means for immediately terminating the communication session when the second network node does not immediately respond to the command.

11. The apparatus of claim 9, further comprising means for implementing a recovery procedure when the second network node does not immediately respond to the command.

12. The apparatus of claim 9, wherein the first network node is a client and the second network node is an access server that executes the protocol in embedded fashion.

13. The apparatus of claim 9, wherein the second network node includes a com port interface coupled to a modem interface, in which the modem interface is coupled to a remote service that provides information to the client.

14. A computer data signal embodied in a carrier wave, the computer data signal carrying one or more sequences of instructions for a first network node to determine that a second network node is active during a communication session using a protocol that defines one or more request messages and one or more corresponding mandatory acknowledgment messages, wherein execution of the one or more sequences of instructions by one or more processors causes the one or more processors to perform the steps of:
    sending a command from the first network node to the second network node, in which the command comprises at least one parameter value that is invalid under the protocol;

sending a response from the second network node to the first network node, in which the response indicates that the parameter value is invalid; and determining, at the first network node, that the second network node is active.

15. The computer data signal of claim 14, the steps further comprising:

testing for immediate receipt of the response from the second network node; and at the first computer process, immediately determining that the second network node is off-line when the response is not immediately received.

16. The computer data signal of claim 15, the steps further comprising terminating the communication session immediately when the second network node does not immediately respond to the command.

17. The computer data signal of claim 15, the steps further comprising implementing a recovery procedure when the second network node does not immediately respond to the command.

18. The computer data signal of claim 15, wherein the first network node is a client and the second network node is an access server that executes the protocol in embedded fashion.

19. The computer data signal of claim 18, wherein the second network node includes a corn port interface coupled to a modem interface, in which the modem interface is coupled to a remote service that provides information to the client.

20. A method for a first network node to determine that a second network node is inactive during a communication session using an application layer network communication protocol that defines one or more request messages and a mandatory acknowledgment message for use in responding to an invalid protocol option, the method comprising:

sending a command from the first network node to the second network node, the command having a parameter value that is invalid under the protocol that is included in the command intentionally to determine whether the second network node is inactive;

waiting to receive a response directed from the second network node to the first network node;

if a response is received substantially immediately and the response indicates that the parameter value is invalid, determining that the second network node is active;

if a response is not received substantially immediately, determining immediately that the second network node is inactive.

21. A network access server that can determine that a network client node is active during a network communication session using a protocol that defines one or more request messages and one or more mandatory corresponding acknowledgment messages, the network access server comprising:

means for sending a command from the network access server to the network client node, the command having a parameter value that is invalid under the protocol;

means for waiting to receive a response directed from the network client node to the network access server;

means for determining, if a response is received substantially immediately and the response indicates that the parameter value is invalid, that the network client node is active;

means for immediately determining, if a response is not received substantially immediately, that the network client node is inactive.

22. A network access server that can determine that a network client node is active during a network communication session using a protocol that defines one or more request messages and one or more mandatory corresponding acknowledgment messages, the network access server comprising:

a processor;

a network interface that is coupled to a network that includes the network access server and the network client node, whereby the processor may send and receive information among the network means and the network client node;

one or more stored sequences of instructions which, when executed by the processor, cause the processor to carry out the steps of:

sending a command from the network access server to the network client node, the command having a parameter value that is invalid under the protocol;

waiting to receive a response directed from the network client node to the network access server;

determining, if a response is received substantially immediately and the response indicates that the parameter value is invalid, that the network client node is active;

immediately determining, if a response is not received substantially immediately, that the network client node is inactive.

23. A computer data signal embodied in a carrier wave, the computer data signal carrying one or more sequences of instructions for a first computer process to determine that a second computer process is active during a network communication session using a network communication protocol that defines one or more request messages and one or more mandatory corresponding acknowledgment messages, wherein execution of the one or more sequences of instructions by one or more processors causes the one or more processors to perform the steps of:

sending a command from the first computer process to the second computer process, the command having a parameter value that is invalid under the protocol;

waiting to receive a response directed from the second computer process to the first computer process;

determining, if a response is received substantially immediately and the response indicates that the parameter value is invalid, that the second computer process is active;

immediately determining, if a response is not received substantially immediately, that the second computer process is inactive.

* * * * *